US 12,466,307 B1

(12) United States Patent
Darlage (10) Patent No.: US 12,466,307 B1
(45) Date of Patent: Nov. 11, 2025

(54) PIVOTABLE LIGHT MODULE FOR A VEHICLE LIGHT SYSTEM (71) Applicant: Valeo Vision, Bobigny (FR)

(72) Inventor: Colby Darlage, Troy, MI (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/906,643

(22) Filed: Oct. 4, 2024

(51) Int. Cl.
B60Q 1/00 (2006.01)
B60Q 1/076 (2006.01)
F21S 41/19 (2018.01)

(52) U.S. Cl.
CPC ............ B60Q 1/076 (2013.01); F21S 41/192 (2018.01); B60Q 2200/32 (2013.01)

(58) Field of Classification Search
CPC ............ B60Q 2200/30; B60Q 2200/32; B60Q 2200/34; B60Q 2200/36; B60Q 2200/38; B60Q 1/06; B60Q 1/064; B60Q 1/68; B60Q 1/0683; B60Q 1/0686; B60Q 1/072; B60Q 1/076; B60Q 1/08; B60Q 1/085; B60Q 1/10; B60Q 1/105; B60Q 1/11; B60Q 1/115
See application file for complete search history.

(56) References Cited

U.S. PATENT DOCUMENTS

| 4,578,740 | A | 3/1986 | Krizmanic | |
| 4,843,523 | A | 6/1989 | Nakamura | |
| 4,916,587 | A | 4/1990 | Hirose et al. | |
| 5,067,052 | A | 11/1991 | Suzuki et al. | |
| 7,575,353 | B2 * | 8/2009 | Oyama | F21S 41/635 362/539 |
| 7,618,174 | B2 * | 11/2009 | Yasuda | F21S 41/675 362/531 |
| 2008/0144329 | A1 * | 6/2008 | Okuda | F21S 41/155 362/547 |
| 2013/0051058 | A1 * | 2/2013 | Bako | B60Q 1/28 362/249.02 |
| 2018/0187851 | A1 | 7/2018 | Hossfeld | |

FOREIGN PATENT DOCUMENTS

WO WO-2024004540 A1 * 1/2024

* cited by examiner

Primary Examiner — Robert J May
(74) Attorney, Agent, or Firm — Young Basile Hanlon & MacFarlane, P.C.

(57) ABSTRACT

A light system of a vehicle comprising a removable light module, a housing with a receptacle to receive the light module, and a coupling to secure the light module to the housing. The light module includes a light emitter, an inner lens and a pivot. The inner lens of the light module is located at an end of the light module and the pivot has a center of rotation located between a midway point of the light module and the inner lens.

20 Claims, 10 Drawing Sheets

PIVOTABLE LIGHT MODULE FOR A VEHICLE LIGHT SYSTEM

FIELD

The present teachings relate to a light module for a vehicle light system which includes a light emitting module and pivot that allows the light module position to be adjusted.

BACKGROUND

Vehicles include many different types of light systems. Some types of light systems included on a vehicle are low beam headlights, high beam headlights, tail lights, turn signal lights, fog lights, running lights, or a combination thereof. Each of these light systems extend out of an outer surface of a vehicle so that they provide light for the driver or provide notice of surrounding drivers.

Examples of light systems may be disclosed in U.S. Pat. Nos. 4,578,740; 4,843,523; 4,916,587; and 5,067,052 all of which are expressly incorporated herein by reference for all purposes. There is a need for a light system where the light source may be removed independently of the light system. Further, there is a need for a light system where the aiming of a light source within the light system may be accomplished in a satisfactory manner while reducing the size of the lens of the light system.

SUMMARY

The present teachings provide a removable light module for a vehicle light system. The present teachings position the center of rotation of the light module as close as possible to the outer lens of the light system so that the light system bezel size and lens size may be reduced without interfering with light output from the light module. The present teachings provide a method for installing a removable light module within a vehicle light system, aiming the light module, and securing the light module within the vehicle light system.

The present teachings provide a light system including one or more light modules, each of the one or more light modules include a light emitter, a lens, and a pivot; a housing comprising one or more receptacles wherein each of the one or more receptacles is configured to accept one or more of the one or more light modules; and one or more couplings to movably attach the one or more light modules to the housing; wherein one or more of the one or more light modules is removeable from the housing and is moveable about the pivot relative to the housing when attached to the housing.

The present teachings provide one or more couplings are each selectively movable between an engaged position and a disengaged position; the one or more couplings in the engaged position have a fixed orientation so that the one or more light modules are fixed with respect to the housing; and the one or more couplings in the disengaged position free the one or more light modules to move about the pivot with respect to the housing.

The present teachings provide a pivot of the one or more light modules further comprises a convex surface; the one or more receptacles further comprise a concave surface shaped to abut the convex surface such that the one or more light modules are selectively pivotable relative to the housing as the convex surface slides along the concave surface; and a coupling of the one or more couplings maintains contact between the convex surface and the concave surface.

The present teachings provide a convex surface and the concave surface abut to define a contact area; the contact area is a portion of a sphere; and the one or more light modules selectively pivot with respect to the housing about a center of rotation that is interior to the sphere.

The present teachings provide a pivot of the one or more light modules cooperate with a respective receptacle of the one or more receptacles to form a ball-and-socket joint.

The present teachings provide one or more light modules are configured to generate light and direct the light in a first direction; the one or more light modules include a first end and a second end defining a length extending in the first direction from the first end to the second end; and the one or more light modules selectively pivot with respect to the housing about a center of rotation that is located between the second end and a midway point along the length between the first end and the second end.

The present teachings provide a receptacle of the one or more receptacles of the housing further comprises a thread flange; and a coupling of the one or more couplings further comprises a pivot nut that removably connects to the thread flange so that the one or more light modules are removably accessible within the housing when the pivot nut is removed from the thread flange.

The present teachings provide the pivot of the one or more light modules cooperate with the receptacle to form a ball-and-socket joint.

The present teachings provide the light system further comprises an adjustment mechanism that is an electromechanical actuator and control system to selectively pivot the one or more light modules about an axis of rotation.

The present teachings provide a light system of a vehicle comprising: a housing having an outer lens; one or more light modules removably mounted to the housing, each light module including a light emitter and an inner lens; one or more couplings to secure each of the one or more light modules to the housing; and a pivot, operably coupled between the housing and each of the one or more light modules, the pivot allowing relative motion between the one or more light modules and the housing; wherein each light module includes a first end and a second end defining a length; and wherein each light module is coupled to the pivot at a location that is past a midway point along the length that is closer to the first end than the second end.

The present teachings provide a coupling of the one or more couplings selectively moves between an engaged position and a disengaged position; the coupling in the engaged position fixes an orientation of each of the one or more light modules with respect to the housing; and the coupling in the disengaged position frees the one or more light modules to move about the pivot with respect to the housing.

The present teachings provide the coupling further comprises a thread flange, attached the housing; and a pivot nut that removably connects to the thread flange so that a light module of the one or more light modules is removably accessible within the housing when the pivot nut is removed from the thread flange.

The present teachings provide the center of rotation of the pivot of the light module is located within the inner lens of the light module.

The present teachings provide the light system further comprises an adjustment mechanism that is an electromechanical actuator and control system to selectively pivot the light module about an axis of rotation.

The present teachings provide the pivot of the light module further comprises a ball-and-socket joint.

The present teachings provide a method comprising obtaining one or more light modules each comprising a light emitter, a lens, and a pivot; installing the one or more light modules within a receptacle of a housing; aiming the one or more light modules by rotating the one or more light modules about the pivot of each of the one or more light modules; and securing the one or more light modules in an aimed position.

The present teachings provide the installing further comprising engaging a pivot nut against a thread flange to secure the one or more light modules into the housing such that the one or more light modules are moveable relative to the housing.

The present teachings provide the securing further comprising engaging the pivot nut against the thread flange to affix the one or more light modules in the aimed position.

The present teachings provide the aiming further comprising rotating the one or more light modules about a center of rotation that is located in the lens of the of the one or more light modules.

The present teachings provide the aiming further comprises actuating an electromechanical adjustment mechanism to control motion of the one or more light modules about an axis of rotation.

The foregoing elements and features can be combined in various combinations without exclusivity, unless expressly indicated otherwise. These elements and features, as well as the operation thereof, will become more apparent in view of the following detailed description with accompanying drawings. It should be understood that the following detailed description and accompanying drawings are intended to be exemplary in nature and non-limiting.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present teachings relate to a light system. The light system may be located within a vehicle. The light system may be part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project in a forward direction, rear direction, side direction, or a combination or sub-combination thereof. For example, the light system may project light from an external surface of the vehicle to a location in front of the vehicle, at an angle relative to the front of a vehicle, or in the direction of movement of the vehicle. The light system may direct some light at the ground. The light system may direct some light above the ground. The light system may be integrated into a front end, a rear end, or both of a car. The light system may project light out of the vehicle. The light systems may be multiple light systems stacked one above the other or integrated into a single light system. The light system of the vehicle may be two or more, three or more, or four or more light systems located one above another. The light system may have a high beam and a low beam. A total height of the light systems may be decreased by placing all of the light sources in a single plane or on a same plane.

The light system may have a housing to protect internal components from the outside environment, provide structural support for the internal components, and provide attachment points to connect the light system to a vehicle. The housing may consist of an outer lens, one or more bezels to frame the light output of one or more light modules, a receptacle to receive one or more light modules, and one or more couplings to attach a light module to the housing. The housing may include an adjustment mechanism to move the pivot, wiring and electrical connectors that may provide a connection to power and control the internal components. The outer lens functions to form an outermost surface of a light system on the exterior of a vehicle. The outer lens may aim light. The outer lens may reflect or refract the light. The outer lens may protect the light system. The outer lens may be clear or colored. The outer lens may be located over or proximate to a reflector housing, a receptacle, a bezel, or a light module.

The bezel is a frame that may provide an aperture to allow light produced by the light module to pass through. The aperture may be a void between bezel frame portions that allows light produced by the light module to pass through. The bezel may be incorporated as part of the styling of the vehicle to provide an aesthetically pleasing appearance. The bezel may be formed as a part of the housing of the light system or may be a separate component attached to or located within the housing of the light system. The bezel may be sized so that the light module may be adjusted in multiple directions while allowing light generated by the light module to pass through without interference from the edge of the bezel aperture. The bezel may be made of an opaque, translucent, or transparent material.

The housing may include one or more receptacles for receiving a light module. A receptacle may be an opening in the housing, an extension from the housing or a combination of both. The receptacle may be located on a portion of the housing opposite the outer lens. The receptacle may be formed to accept a light module. The shape of the receptacle may be conformal to the shape of the light module (e.g. as in a socket of a ball-and-socket joint) or may be a square, rectangle, triangle, a polygon, a geometric shape, a non-geometric shape, symmetrical, asymmetrical, or a combination thereof. The receptacle may include features which guide the light module into the opening when installing a light module (e.g. a slot, poke-yoke feature, or the like). The receptacle may include a mechanism, such as a clip, latch, threaded flange, or other securement to secure the light module.

The light module may be a light source that functions to produce light. The light module may be a device or a plurality of devices that create light and the light extends outward from the light module. The light module may produce a high beam, a low beam, a blending beam, a running light, a day time light, a turn signal, a brake light, or a combination thereof. The light module may be aimed for near light, far light, blending light that blends the far light and near light together, or a combination thereof. The light modules may have different functions. For example, one light module may provide a running light and another light module may be a turn signal or fog light. The light module may comprise a plurality of lights or may be a single light module within a set of light modules. The plurality of lights may be in one set or group of light modules. The light module may be a single light that projects light. A light module may be replaceable so that in the case of a light module failure, a replacement light module may be installed in the light system.

In another example, a single light module may include a light emitter, a reflector, an inner lens, and electronic components (e.g. a printed circuit board, associated components to power and control the light module, a heat sink). The light emitter may be an incandescent bulb, fluorescent light, compact fluorescent lamp, halogen lamp, light emitting diode (LED), high intensity discharge lamp (HID), halogen light, xenon light, laser diode, phosphorous bulb, or a combination thereof. The light emitter may be a single lamp or bulb. The light emitter may be multiple light sources as in, for example, a series of LEDs on a printed circuit board (PCB). The light emitter may be directional light. The light emitter may have an emission that is a Lambertian emission or a narrow emission angle.

The light emitter may be directional and concentrate light on a light guide towards a light bar, reflector, or a combination thereof. The light emitter may be fixed or free of movement. The light emitter may be fixed relative to a reflector or a reflector housing of the light module. The light emitter may be fixed and the light from the light source of the light emitter may be moved, bent, directed, or a combination thereof via optical elements or reflectors (e.g., a light guide). A single light emitter may be directed at a single reflector or light guide. Each light source of the light emitter may be turned on and off. The light emitter may be located within a light module at a location relative to a light guide. Each light guide may receive light from a single light source. The light sources may work together as a set of light sources to create light as a light emitter.

The reflector functions to direct or redirect light from a light emitter to a location external to the light module, light system, vehicle or all three. The reflector may be aimed. The reflector may be sized and shaped to direct light to a predetermined region or location. The reflector may be connected to the light emitter or light module. The reflector may include a primary reflector surface, a secondary reflector surface, or both.

The reflector surfaces (e.g., primary or secondary) redirect light away from the light module, the vehicle, the light source, or all. The reflector surface may be a metal, metalized plastic, or other reflective material that reflects light. The reflector surface may include one or more reflector facets or a plurality of reflector facets. The reflector surfaces may direct a running light, a low beam, a high beam, or a combination thereof. The reflector surfaces may have a pre-aim or aimed configuration relative to the light module.

The inner lens functions to form an outermost surface of a light module. The inner lens may aim light. The inner lens may reflect or refract the light. The inner lens may protect the light module. The inner lens may be clear or colored. The inner lens may form one end of the light module or be located at one end of the light module. The light generated by the light emitter may be directed to an inner lens of the light module, for example by a light guide, reflector, or both. The inner lens of the light module may be located at one end of the light module and focus the light generated by the light emitter. A light guide or reflector may direct the light from the light emitter to the inner lens. The inner lens of the light module may create a cone of light with an optical axis. The optical axis may be directed at the outer lens of the light system housing. The optical axis may be directed away from the vehicle. When a light module is installed in a light system, the inner lens of the light module may be adjacent to the bezel and outer lens of the light system.

The electronic components of the light module may include an electrical connector, power supply (e.g. DC-DC converter, transformer or the like), circuit board, wiring, and associated electronic hardware and support the generation of light by the light emitter. The electronic components may form part of the light module or may be attached to the light module. The heat sink of the light module may be a passive component designed to absorb and dissipate heat generated by the electronic components and the light emitter of the light module. The heat sink may be made of a metal such as aluminum, copper, or other suitable conductive material. The heat sink may form part of the light module or be attached to the light module.

Each light module may include a pivot. The pivot may allow the light module to rotate relative to the light system in at least one direction so that the light module may be adjusted when aiming the light output of the light module. The pivot may be fully a part of the light module or the light module may comprise one portion of the pivot, and the other portion of the pivot may be part of the housing. For example, the pivot may be a ball-and-socket assembly incorporated into the light module. The light module may be bolted, clipped or otherwise secured to the light system housing. The light module or a portion of the light module may be spherical in shape or be a ball portion of a ball-and-socket joint. The receptacle may comprise the socket portion of the ball-and-socket joint. The pivot may be cylindrical. The pivot may rotate about a single axis (e.g. the pivot may be a rod or cylinder and fit within a conformal socket of a receptacle). The pivot may rotate 2 or more axes, or 3 or more axes (e.g. the pivot may be a ball-and-socket joint). The pivot may also be a mechanical linkage that allows motion of the light module relative to the light system (e.g. a Watts linkage or pair of Watts linkages; rack and pinion system; slot and pin system; or the like). The pivot may be located near the inner lens of the light module. The pivot may be integrated into the inner lens of the light module (e.g. the inner lens itself may form a ball portion of a ball-and-socket joint). The pivot may form a portion of a ball of a ball-and-socket joint and be attached to the light module by a connector portion at the lens of the light module.

In another example, a portion of the pivot may be one or more rods incorporated into the receptacle of the housing. The one or more rods may be positioned opposite each other on opposing sides of the receptacle. The one or more rods may have a cross-sectional shape. All or a portion of the cross-section of the rods may be circular, oval, tear dropped, symmetrical, asymmetrical, or a combination thereof. Each rod has a length and a width. The length is a major dimension of each rod. The width is a minor dimension of the rod. The length may be in an axial direction of the rod. The light module may have one or more corresponding slot, socket, or opening to receive the one or more rods when the light module is inserted into the receptacle of the housing. The light module, when inserted in the receptacle of the housing, may be movable about the one or more rods to provide rotational adjustment, translational adjustment or both rotational and translational adjustment of the light module. The light module may rotate about a longitudinal axis of the pivot (e.g., rod). The length of the one or more rods may form an axis of rotation of the light module. The one or more rods may form a portion of the light module and the slot, socket, or opening may be incorporated into the housing.

The center of rotation of the pivot may be located between a midway point along the length of the light module and the inner lens of the light module, or within the inner lens of the light module. The center of rotation of the light module may be at a location of the light module that is proximate the outer lens of the light system when the light module is installed in the light system. For example, the center of rotation may be located at the end of the light module defined by the inner lens of the light module. The center of rotation may be located at the mid-point or between the mid-point and the end of the light module. The center of rotation may be located between 66% and 100% of the length of the light module; between 75% and 100% of the light module; between 80% and 100% of the length of the light module; between 90 and 100% of the length of the light module; located at the end or near the end of the light module (e.g. within 5 mm of the end of light module); or at a location beyond the end of the light module. By positioning the center of rotation near the inner lens of the light module, the distance between an upper and lower edge of the aperture of the bezel of the light system may be minimized when designing a light system while still preventing the bezel from interfering with light output from the light module for a variety of light module adjustment positions.

Each of the set of light modules may direct light on a first side and a second side of an optical axis. Some of the light may extend on an inboard side of the optical axis (e.g., in a direction towards a center of a vehicle). Some of the light may extend on an outboard side of the optical axis (e.g., in a direction away from a center of a vehicle). Some of the light may extend above or below the optical axis. The light may function to illuminate a region around a vehicle so that an operator may view surroundings. The light may be generated by the light emitter and be directed into a reflector that directs the light through an inner lens of the light module.

An adjustment mechanism may adjust the pivot to move a light module relative to the light system housing. The adjustment mechanism may adjust the pivot orientation and then maintain the orientation. The adjustment mechanism communicates with the pivot to allow the light module to be aimed within the light system of the vehicle. The adjustment mechanism may rotate or adjust the pivot of the light module about one or more axes of rotation. The adjustment mechanism may rotate the pivot about an x-axis, y-axis, z-axis, or a combination or sub-combination of all three axes (e.g. in pitch, yaw, and roll). The adjustment mechanism may rotate the pivot only about a single axis. The adjustment mechanism may rotate the pivot about two axes. Multiple adjustment mechanisms may be used to move the light module in multiple directions. For example, one adjustment mechanism may rotate the pivot in pitch, a second adjustment mechanism may rotate the pivot in yaw, and a third adjustment mechanism may rotate the pivot in roll. The adjustment mechanism may be moved about 1 cm or less, about 8 mm or less, about 5 mm or less, about 3 mm or less. The adjustment mechanism may be moved about 0.01 mm or more, about 0.1 mm or more, about 0.5 mm or more, or about 1 mm or more. The adjustment mechanism may include a rod, screw, a pivot member, ball-and-socket joint, or all three.

The adjustment mechanism may be an electromechanical actuator and control system, such as with a linear motor, screw drive, solenoid, or the like. The electromechanical actuator and control system may be connected to the vehicle electrical system for power and control via wiring and one or more electrical connectors located within or attached to the light system housing. The adjustment mechanism may also be manually actuated via a screw drive, rod, lever, or the like. The adjustment mechanism may be a part of the light system housing, may form part of the light module, may be attached to the light system housing, or may be a separate unit or units acting only on the light module.

A coupling functions to connect a light module to the housing of the light system. The coupling may be a screw connection, clip connector, flange with bolt-on connection, friction fit, latch mechanism, or the like. The coupling may be a pivot nut that attaches to a thread flange of a receptacle of the housing. The coupling may comprise a friction or snap fit between one or more pivots (e.g., rod portions) of the housing and one or more receptacles (e.g., slot portions) of a light module. The coupling may be made of a material including plastic, metal, aluminum, polycarbonate, or a combination thereof. The coupling may form part of the pivot of a light module or housing (e.g. one portion of a socket of a ball-and-socket joint). The coupling may be more flexible than the light module so that the coupling conforms to the light module when the coupling secures the light module to the housing; the coupling may be more rigid than the light module so that the light module conforms to the coupling as the coupling secures the light module to the housing; or both may have some elasticity so that both the coupling and the light module move to assist in securing the light module to the housing. The coupling may, when secured, prevent motion of the light module relative to the housing.

The coupling may have an engaged and a disengaged position. When in the engaged position, the coupling may be attached to the housing of the light system while securing the light module in an aimed position. When in a disengaged position, the coupling may secure the light module to the housing while still allowing relative motion between the light module and the light system housing. In the disengaged position, the light module may be aimed. For example, the coupling may be a pivot nut. The receptacle may have a thread flange connection. The light module may include a pivot that has a spherical feature that acts as a ball portion of a ball-and-socket joint. The spherical feature may comprise a convex surface. The pivot nut and receptacle may comprise a concave surface shaped to abut the convex surface of the light module and form the ball portion of a ball-and-socket joint. The pivot nut, when threaded onto the thread flange, may secure the pivot of the light module via compression between the concave surfaces of the pivot nut and receptacle and the convex surface of the pivot. This compression may define a contact area between the convex surface and the concave surface. In this way, in a disengaged position, the pivot nut may maintain contact between the convex surface and the concave surface while allowing motion of the light module and retaining the light module within the receptacle of the housing. By further tightening the pivot nut on the thread flange, the pivot nut may compress the spherical feature to secure the light module in an engaged position and prevent motion of the light module.

Figure 1:
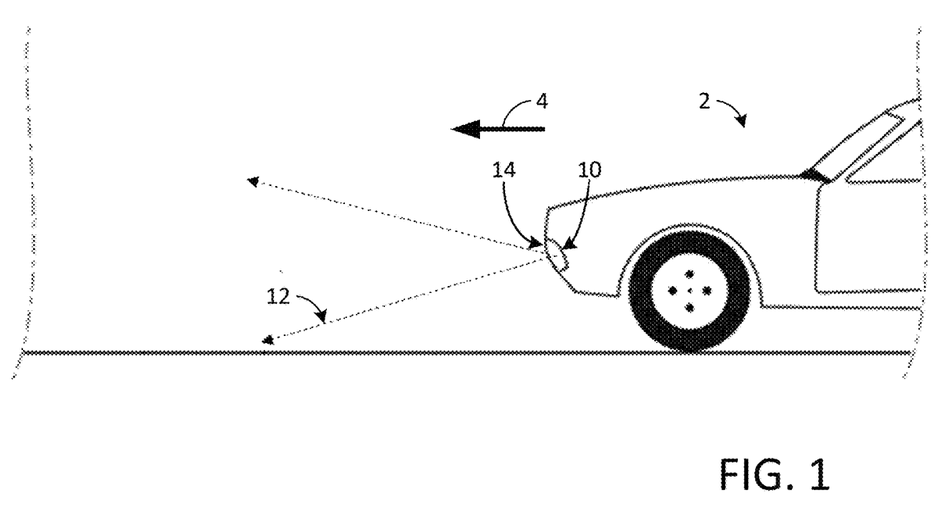
FIG. 1 is a side view of a vehicle including a light system.

FIG. 1 illustrates a vehicle 2 facing a direction of movement 4. The vehicle 2 includes a light system 10. The light 12 generated by the light system 10 passes through an outer lens 14 to illuminate a region around the vehicle 2.

Figure 2:
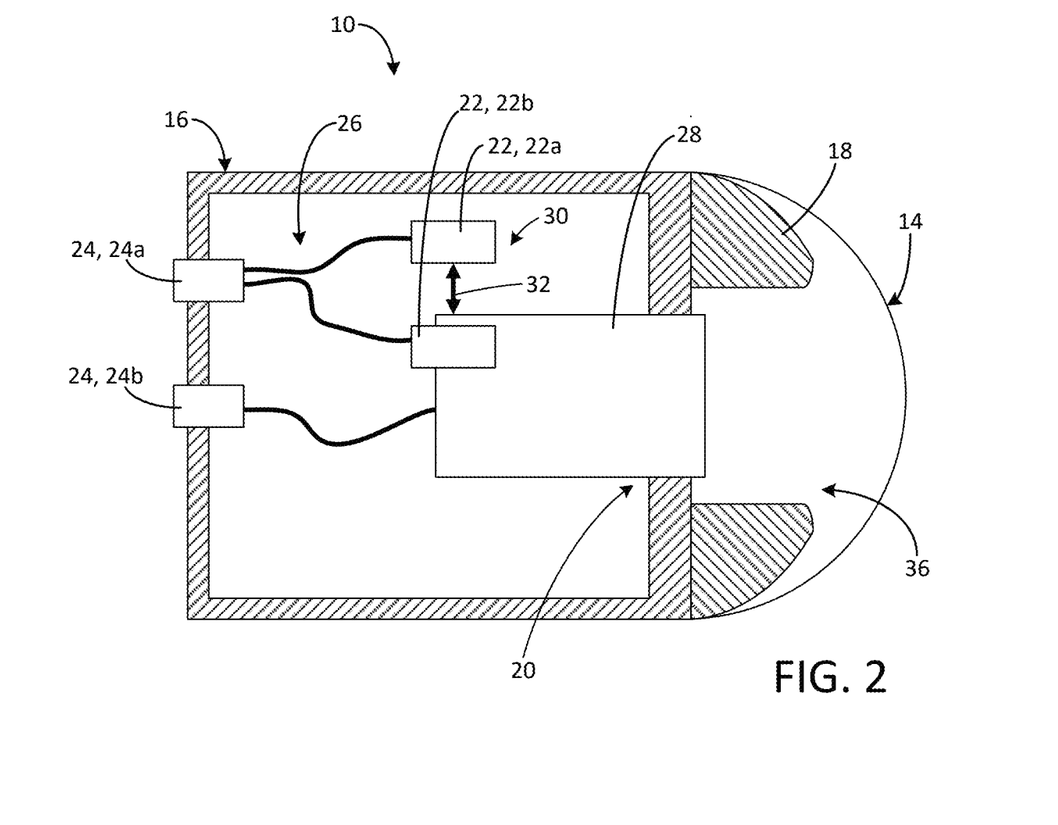
FIG. 2 is a schematic diagram of a light system.

FIG. 2 illustrates a schematic diagram of the light system 10. The light system includes an outer lens 14, a housing 16, a bezel 18, a receptacle 20, one or more adjustment mechanisms 22, one or more electrical connectors 24, wiring 26, and a light module 28 located within the receptacle 20. Each adjustment mechanism 22 may be an electromechanical actuator and control system 30 that may adjust the position of the light module 28 relative to the housing 16 of the light system 10 along one or more axes. For example, a first adjustment mechanism 22a may provide vertical adjustment 32 and a second adjustment mechanism 22b may provide horizontal adjustment 34 (not shown). A first electrical connector 24a may provide an electrical power and/or control connection to one or more adjustment mechanisms 22. A second electrical connector 24b may provide an electrical power and/or control connection to one or more light modules 28. The opening within the bezel 18 defines an aperture 36 of the bezel 18.

Figure 3:
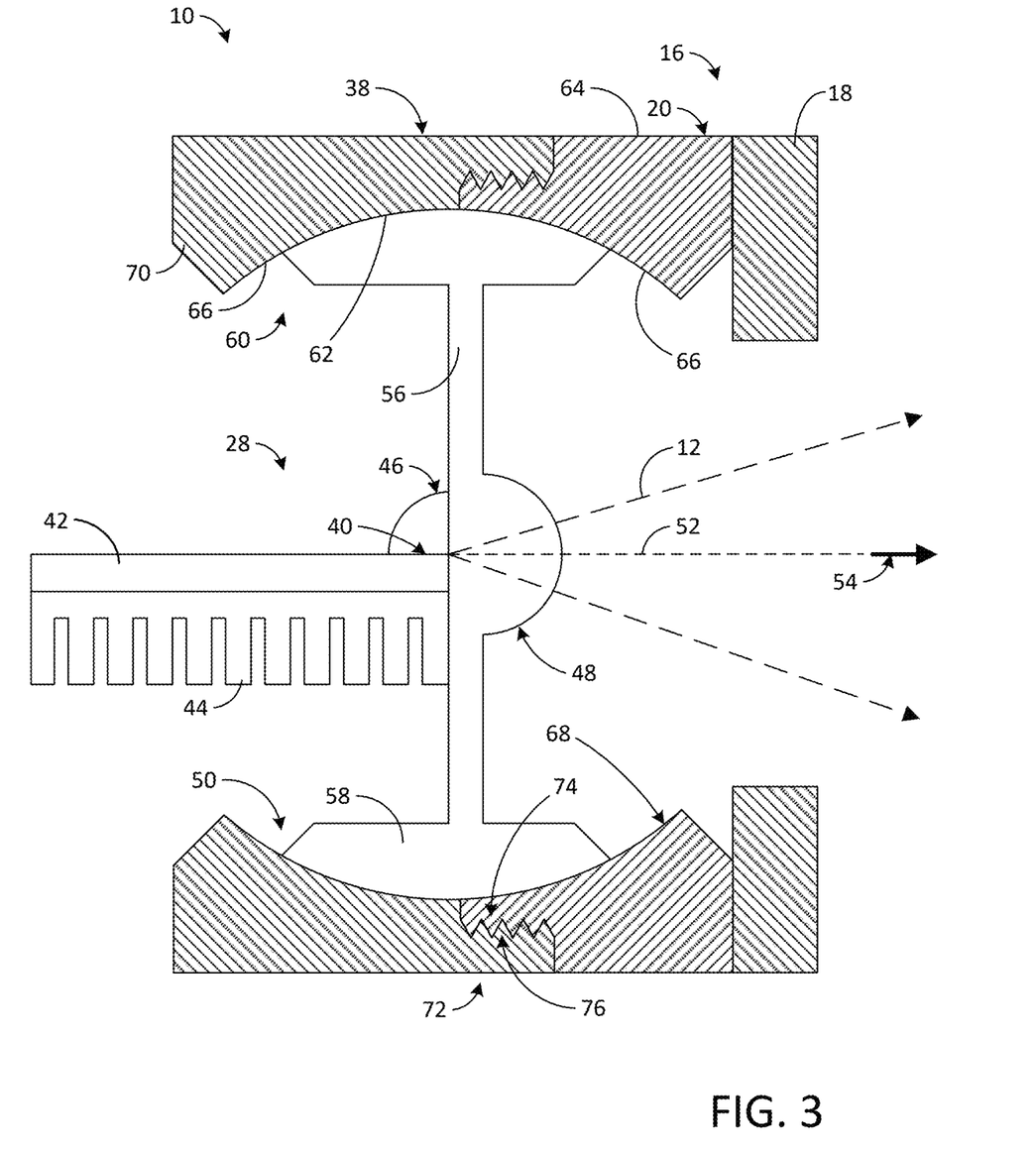
FIG. 3 is a simplified cross-sectional side view of a light module installed within a receptacle of the light system housing.

FIG. 3 is a simplified cross-sectional side view of the light system 10 showing a light module 28 installed in a receptacle 20 of the housing 16 with a coupling 38 attached to the housing 16. The light module 28 comprises a light emitter 40, electronic components 42, a heat sink 44, a reflector 46, an inner lens 48, and a pivot 50. The light 12 generated by the light emitter 40 of the light module 28 has an optical axis 52 that extends in a first direction 54. The pivot 50 is connected to the inner lens 48 of the light module 28 by an extension 56 and may form a ball portion 58 of a ball-and-socket joint 60. The ball portion 58 may be generally spherical and have a convex surface 62. For simplification, the ball portion 58 of the pivot 50 behind the plane of the figure is not shown. The receptacle 20 comprises a thread flange 64 and a bezel 18 of the light system 10. A concave surface 66 formed by the coupling 38 and receptacle 20 forms the socket portion 68 of a ball-and-socket joint 60. The receptacle 20 may form one part of the socket portion 68 and the coupling 38 may comprise another part of the socket portion 68. For simplification, the outer lens 14 and portions of the housing 16 behind the light module 28 (e.g. the bezel 18 and receptacle 20) are not shown. A coupling 38 comprises a pivot nut 70 secured to the thread flange 64 via a threaded connection 72. The thread flange threads 74 and coupling threads 76 communicate to secure the coupling 38 to the thread flange 64. The pivot nut 70 may have a concave surface 66 and be conformal with the convex surface 62 of a pivot 50 of the light module 28. For simplification, the portion of the coupling 38 behind the light module 28 is not shown.

Figure 4A:
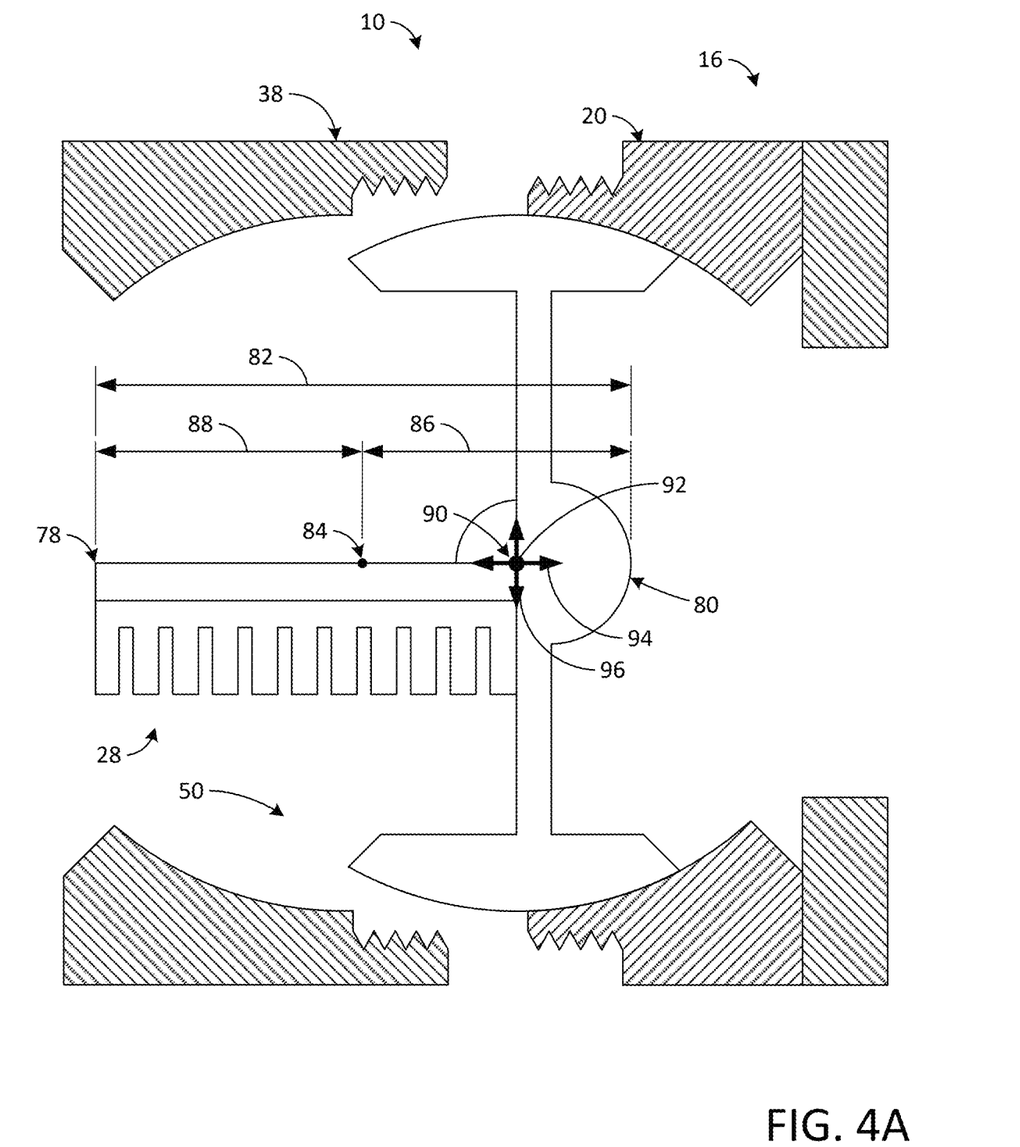
FIG. 4A. is a simplified cross-sectional side view of a light module inserted within a receptacle of the light system of FIG. 3 showing the light module being received by the receptacle and a coupling not attached to the light system housing.

FIG. 4A is a simplified cross-sectional side view of the light system 10 of FIG. 3 showing the light module 28 received by the receptacle 20. The coupling 38 is not attached to the housing 16. The first end 78 of the light module 28, the second end 80 of the light module 28 define a length 82 of the light module. The midpoint 84 of the light module 28 is halfway between the first end 78 and the second end 80 of the light module 28. The midpoint 84 defines the front portion 86 and the rear portion 88 of the light module 28. The pivot 50 of the light module 28 has a center of rotation 90 that is between the midpoint 84 and the second end 80 of the light module 28 in the front portion 86 of the light module 28. The pivot 50 may rotate about one or more of a pitch axis 92 (shown going into and out of the page), a roll axis 94, or a yaw axis 96.

Figure 4B:
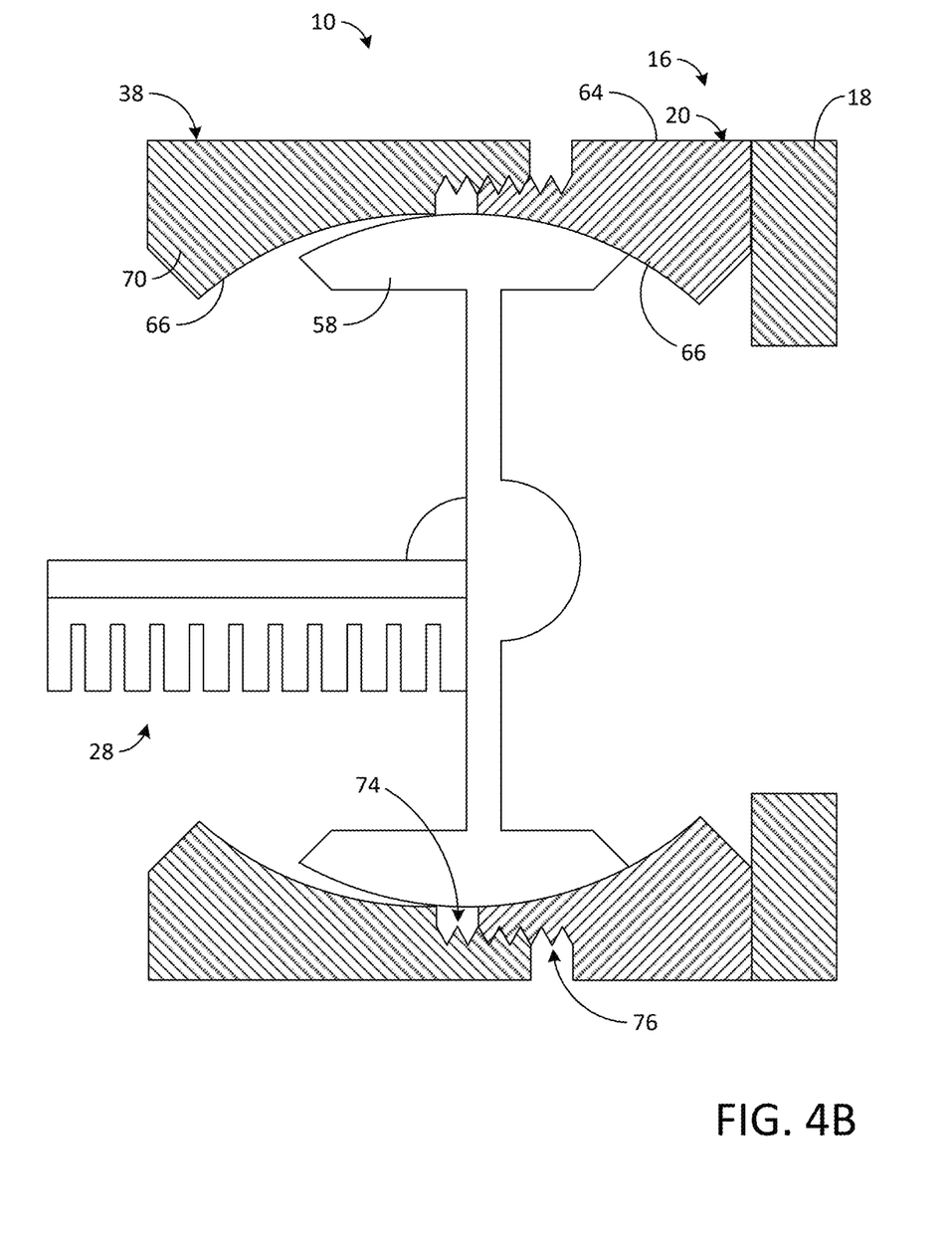
FIG. 4B is a simplified cross-sectional side view of the light system of FIG. 4A, showing the light module installed within the receptacle of the light system and the coupling attached to the housing in a disengaged position.

FIG. 4B is a simplified cross-sectional side view of the light system 10 of FIG. 3 showing the light module 28 installed in the receptacle 20 with the coupling 38 attached to the housing 16. The coupling 38 is in the disengaged position 98. In the disengaged position 98, some or all of the coupling threads 76 of the pivot nut 70 and thread flange threads 74 of the thread flange 64 may be coupled. The light module 28 may be able to move within the receptacle 20 so that it may be adjusted. The ball portion 58 of the light module 28 may contact both the concave surface 66 of the socket portion 68 of the receptacle 20 and pivot nut 70.

Figure 4C:
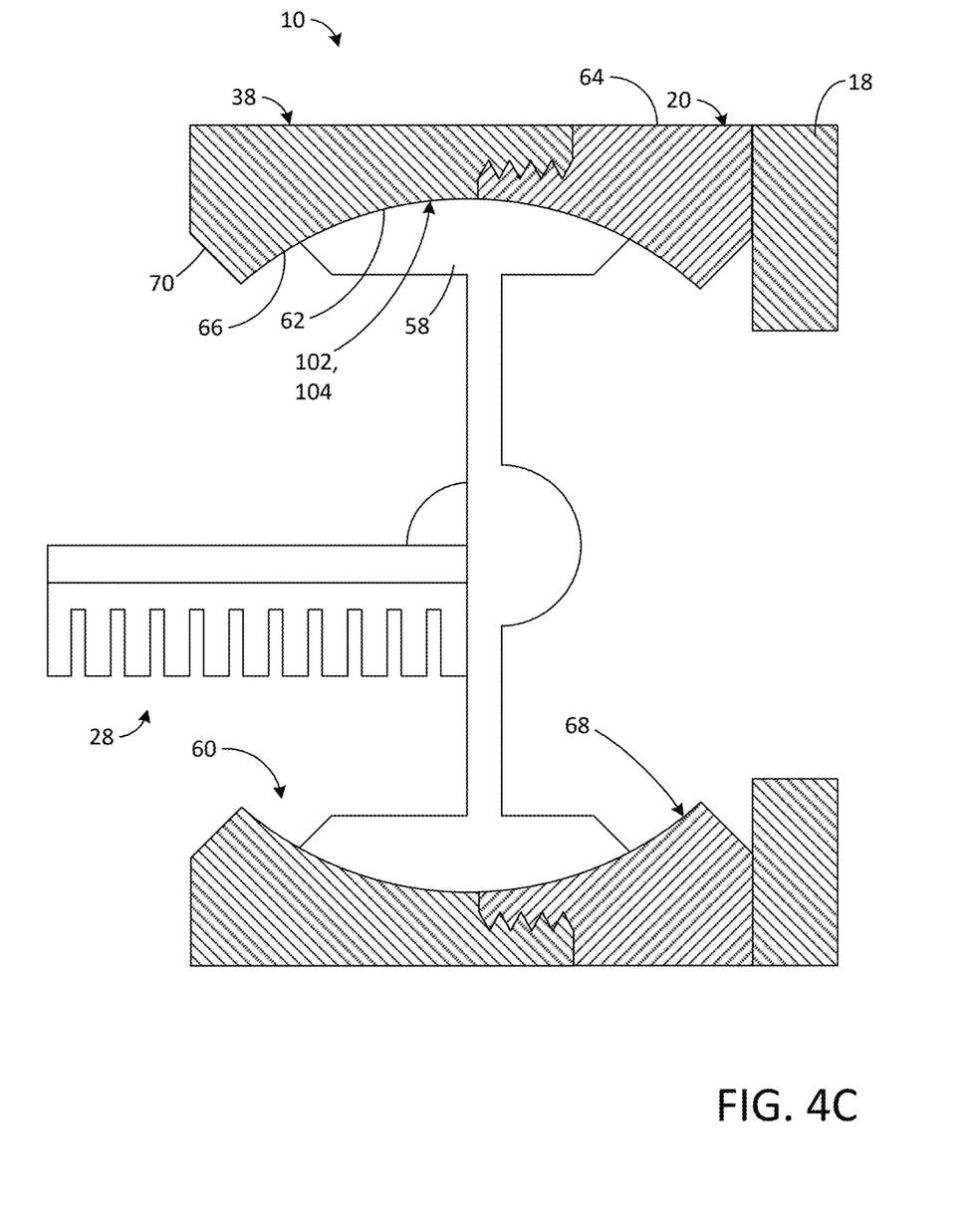
FIG. 4C is a simplified cross-sectional side view of the light system of FIG. 4B, showing the light module installed within the receptacle of the light system, and the coupling in an engaged position.

FIG. 4C is a simplified cross-sectional side view of the light system 10 of FIG. 3 showing the light module 28 installed in the receptacle 20 and the coupling 38 in the engaged position 100. In the engaged position 100, the convex surface 62 of ball portion 58, may be compressed against the socket portion 68 of the ball-and-socket joint 60 defined by the receptacle 20 and coupling 38. In this way, the light module 28 may be secured so that the light module 28 does not move relative to the housing 16. The convex surface 62 of the ball portion 58 abuts the concave surface 66 of the socket portion 68 to define a contact area 102. The contact area 102 may be a portion of a sphere 104

Figure 5:
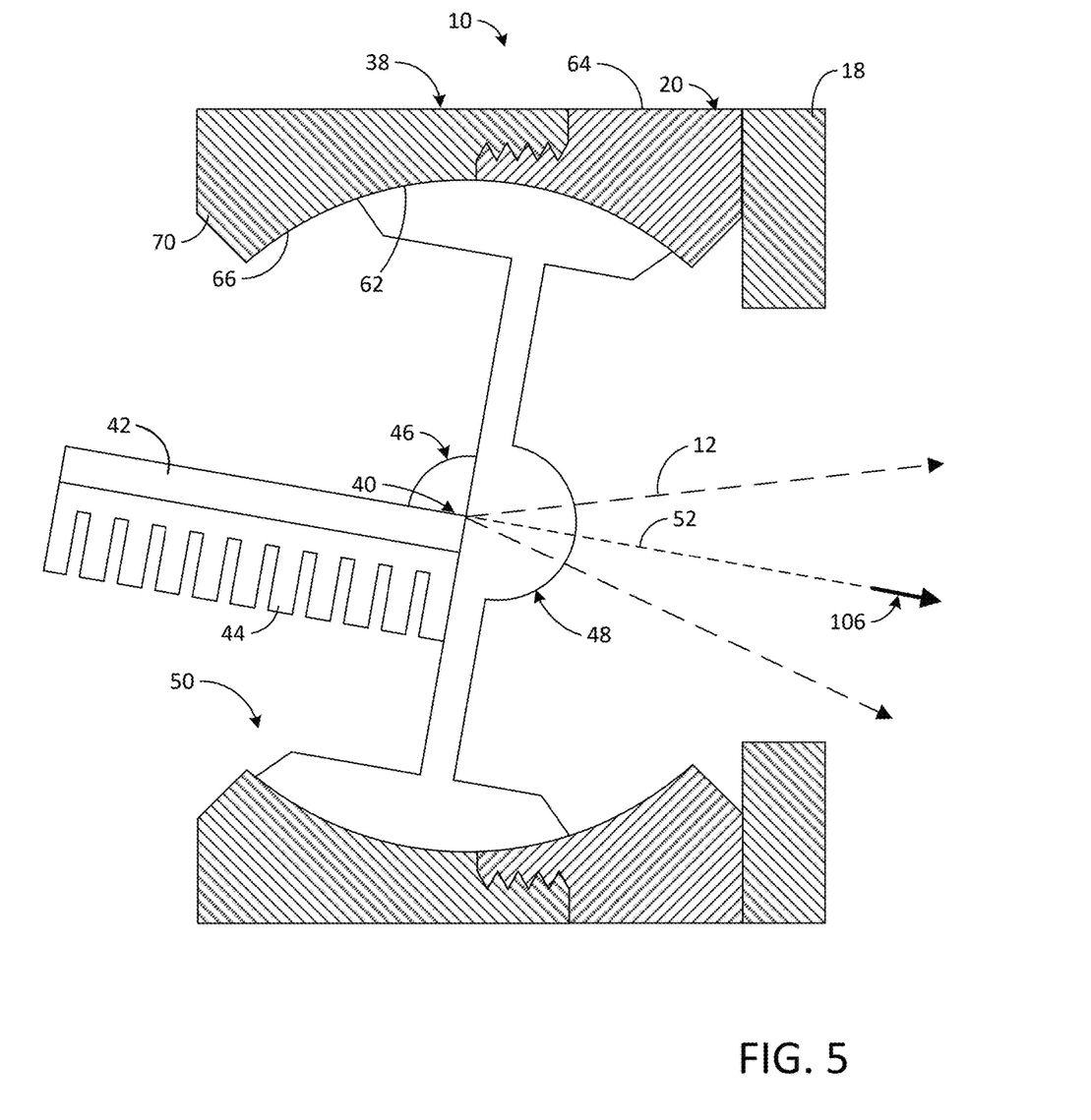
FIG. 5 is a simplified cross-sectional side view of a light module installed within a receptacle of the light system.

FIG. 5 is a simplified cross-sectional side view of the light system 10 of FIG. 3 showing the light module 28 rotated within the receptacle 20 to a second position with optical axis 52 extending in a second direction 106.

Figure 6:
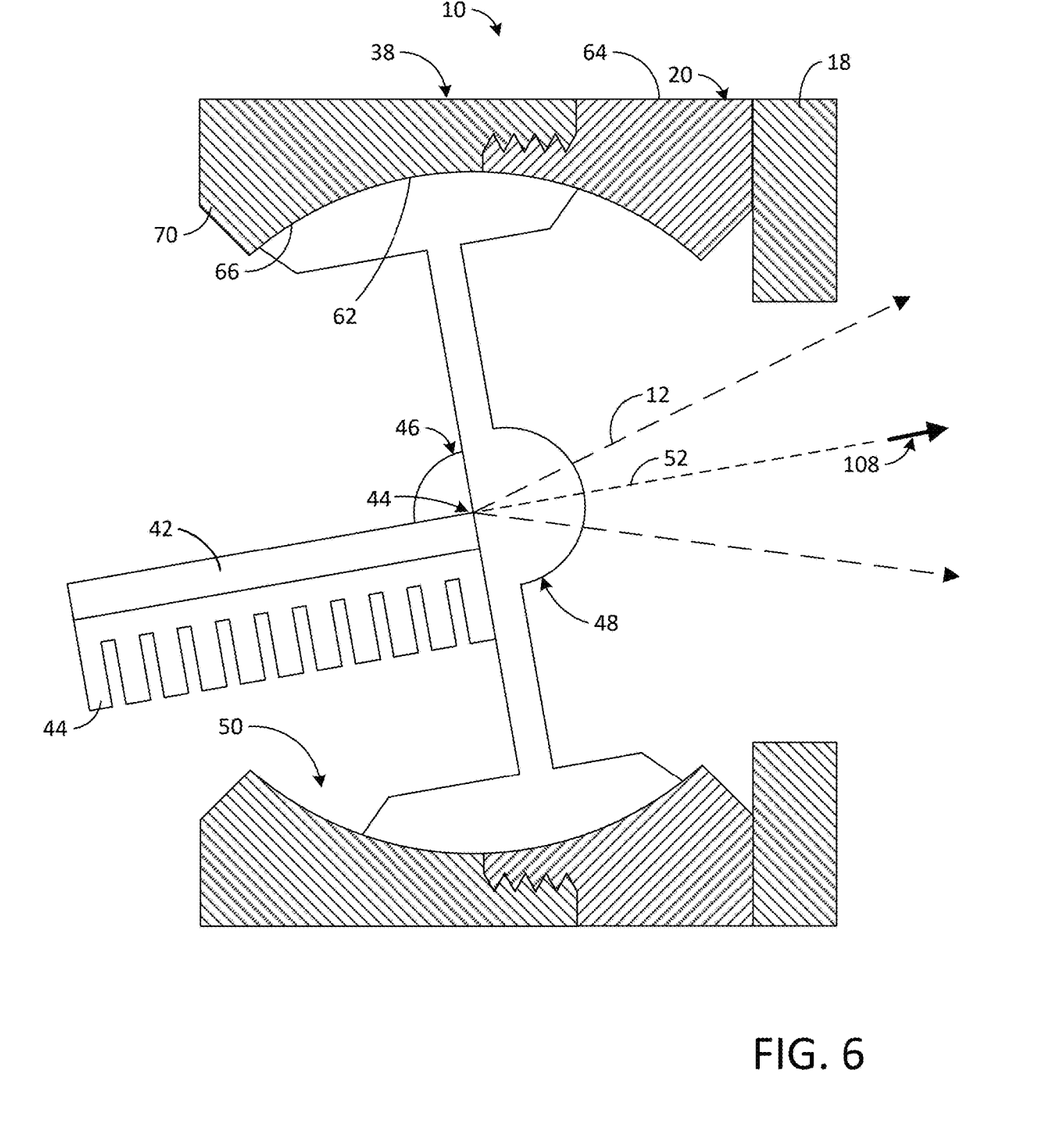
FIG. 6 is a simplified cross-sectional side view of a light module installed within a receptacle of the light system.

FIG. 6 is a simplified cross-sectional side view of the light system 10 of FIG. 3 showing the light module 28 rotated within the receptacle 20 to a third position with optical axis 52 extending in a third direction 108.

Figure 7:
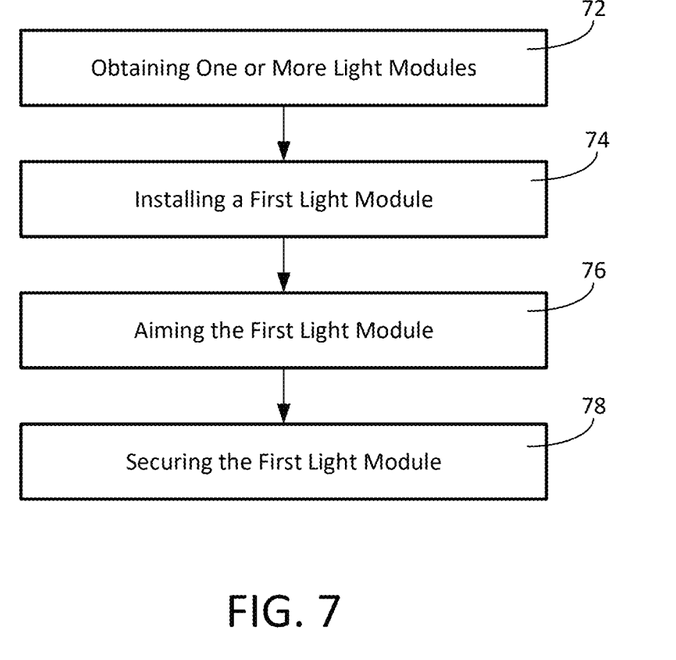
FIG. 7 is a flow diagram of the installation and aiming of a light module in a light system.

FIG. 7 is a flow diagram of the method of installing a new or repaired light module 28 into a receptacle 20 of a light system 10. The method comprises obtaining 110 one or more light modules, installing 112 a first light module, aiming 114 the first light module, and securing 116 the first light module.

Figure 8:
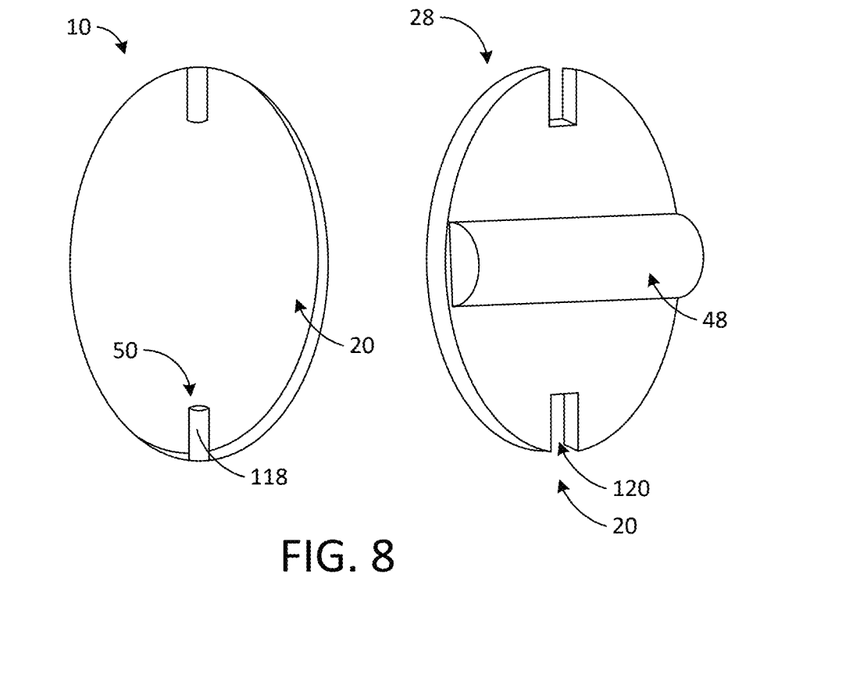
FIG. 8 is an exploded view of a light system.

FIG. 8 is a simplified perspective view of a light system 10 showing the housing 16 incorporating a rod portion 118 of the pivot 50 on the top and bottom portions of the receptacle 20 and a corresponding light module 28 with slot portions 120 formed into the light module 28.

Figure 9:
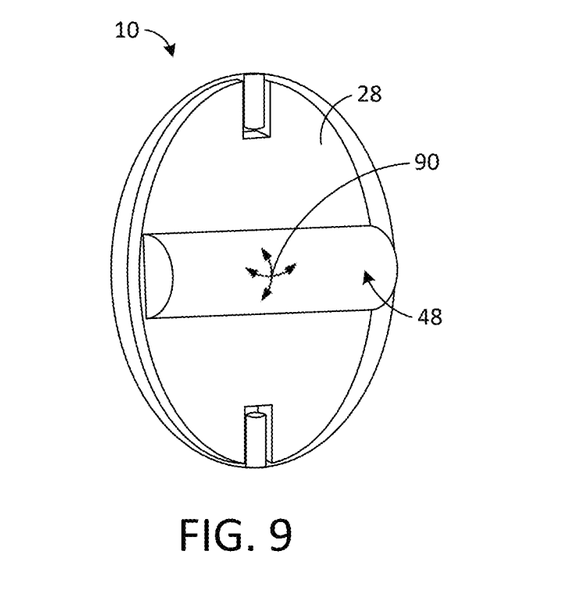
FIG. 9 is a schematic view of the light module of FIG. 8 installed in the housing of FIG. 8.

FIG. 9 is a simplified perspective view of the light system 10 of FIG. 8, showing the light module 28 installed in the housing 16 with the center of rotation 90.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

ELEMENT LIST

2 Vehicle
4 Direction of movement
10 Light system
12 Light
14 Outer lens
16 Housing
18 Bezel
20 Receptacle
22 Adjustment mechanisms
22a First adjustment mechanism
22b Second adjustment mechanism
24 Electrical connectors
24a First electrical connector
24b Second electrical connector
26 Wiring
28 Light module
30 Electromechanical actuator and control system
32 Vertical adjustment
34 Horizontal adjustment
36 Aperture
38 Coupling
40 Light emitter
42 Electronic components
44 Heat sink
46 Reflector
48 Inner lens
50 Pivot
52 Optical axis
54 First direction
56 Extension
58 Ball portion
60 Ball-and-socket joint
62 Convex surface
64 Thread flange
66 Concave surface
68 Socket portion
70 Pivot nut
72 Threaded connection
74 Thread flange threads
76 Coupling threads
78 First end
80 Second end
82 Length
84 Midpoint
86 Front portion
88 Rear portion
90 Center of rotation
92 Pitch axis
94 Roll axis
96 Yaw axis
98 Disengaged position
100 Engaged position
102 Contact area
104 Portion of a sphere
106 Second direction
108 Third direction
110 Obtaining
112 Installing
114 Aiming
116 Securing
118 Rod portion
120 Slot Portion

What is claimed is:

1. A light system comprising:
   one or more light modules, each of the one or more light modules comprising:
     a light emitter,
     a lens, and
     a pivot;
   a housing comprising one or more receptacles wherein each of the one or more receptacles is configured to accept one or more of the one or more light modules; and
   one or more couplings to movably attach the one or more light modules to the housing;
   wherein one or more of the one or more light modules is removeable from the housing and is moveable about the pivot relative to the housing when attached to the housing; and
   wherein the pivot of the one or more light modules cooperate with a respective receptacle of the one or more receptacles to form a ball-and-socket joint.

2. The light system of claim 1, wherein:
   the one or more couplings are each selectively movable between an engaged position and a disengaged position;

the one or more couplings in the engaged position have a fixed orientation so that the one or more light modules are fixed with respect to the housing; and the one or more couplings in the disengaged position free the one or more light modules to move about the pivot with respect to the housing.

3. The light system of claim 2, wherein:

the pivot of the one or more light modules further comprises a convex surface;

the one or more receptacles further comprise a concave surface shaped to abut the convex surface such that the one or more light modules are selectively pivotable relative to the housing as the convex surface slides along the concave surface; and a coupling of the one or more couplings maintains contact between the convex surface and the concave surface.

4. The light system of claim 3, wherein:

the convex surface and the concave surface abut to define a contact area;

the contact area is a portion of a sphere; and the one or more light modules selectively pivot with respect to the housing about a center of rotation that is interior to the sphere.

5. The light system of claim 1, wherein:

the one or more light modules are configured to generate light and direct the light in a first direction;

the one or more light modules include a first end and a second end defining a length extending in the first direction from the first end to the second end; and the one or more light modules selectively pivot with respect to the housing about a center of rotation that is located between the second end and a midway point along the length between the first end and the second end.

6. The light system of claim 5, wherein:

a receptacle of the one or more receptacles of the housing further comprises a thread flange; and a coupling of the one or more couplings further comprises a pivot nut that removably connects to the thread flange so that the one or more light modules are removably accessible within the housing when the pivot nut is removed from the thread flange.

7. The light system of claim 5, wherein the ball-and-socket joint of the pivot cooperates with the one or more receptacles.

8. The light system of claim 5, wherein the light system further comprises an adjustment mechanism that is an electromechanical actuator and control system to selectively pivot the one or more light modules about an axis of rotation.

9. The light system of claim 1, wherein the pivot has a center of location that is located forward of the light emitter in a direction the light is projected from the light system.

10. A light system of a vehicle comprising:

a housing having an outer lens;

one or more light modules removably mounted to the housing, each of the one or more light modules include a light emitter and an inner lens;

one or more couplings to secure each of the one or more light modules to the housing; and a pivot, operably coupled between the housing and each of the one or more light modules, the pivot allowing relative motion between the one or more light modules and the housing;

wherein each of the one or more light modules include a first end and a second end defining a length;

wherein each of the one or more light modules is coupled to the pivot at a location that is past a midway point along the length that is closer to the first end than the second end; and wherein a center of rotation is located within the inner lens of the one or more light modules.

11. The light system of claim 10, wherein a coupling of the one or more couplings selectively moves between an engaged position and a disengaged position;

the coupling in the engaged position fixes an orientation of each of the one or more light modules with respect to the housing; and the coupling in the disengaged position frees the one or more light modules to move about the pivot with respect to the housing.

12. The light system of claim 11, wherein the coupling further comprises:

a thread flange, attached the housing; and a pivot nut that removably connects to the thread flange so that one of the one or more light modules is removably accessible within the housing when the pivot nut is removed from the thread flange.

13. The light system of claim 10, wherein the light system further comprises an adjustment mechanism that is an electromechanical actuator and control system to selectively pivot each of the one or more light module about an axis of rotation.

14. The light system of claim 10, wherein the pivot further comprises a ball-and-socket joint.

15. The light system of a vehicle of claim 10, wherein the center of rotation is located at the length between 90% and 100% of the length of the light module relative to the first end.

16. A method comprising:

obtaining one or more light modules each comprising a light emitter, a lens, and a pivot;

installing the one or more light modules within a receptacle of a housing;

aiming the one or more light modules by rotating the one or more light modules about the pivot of each of the one or more light modules wherein the aiming further comprises:

rotating the one or more light modules about a center of rotation that is located in the lens of the of the one or more light modules; and securing the one or more light modules in an aimed position.

17. The method of claim 16, wherein the installing further comprises engaging a pivot nut against a thread flange to secure the one or more light modules into the housing such that the one or more light modules are moveable relative to the housing.

18. The method of claim 17, wherein the securing further comprises engaging the pivot nut against the thread flange to affix the one or more light modules in the aimed position.

19. The method of claim 16, wherein the aiming further comprises actuating an electromechanical adjustment mechanism to control motion of the one or more light modules about an axis of rotation.

20. The method of claim 16, wherein the receptacle includes an opening in the housing and light extends from the light emitter and through the opening without the opening interfering with the light from the light emitter.

* * * * *